United States Patent
Bachinski et al.

(10) Patent No.: US 6,550,344 B2
(45) Date of Patent: Apr. 22, 2003

(54) SEMI-FLUSH AIR DATA SENSOR

(75) Inventors: Thomas J. Bachinski, Lakeville, MN (US); Timothy T. Golly, Lakeville, MN (US); Roger D. Foster, Burnsville, MN (US); Brian A. Gilkison, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/849,271

(22) Filed: May 4, 2001

(65) Prior Publication Data

US 2002/0162401 A1 Nov. 7, 2002

(51) Int. Cl.$^7$ ................................................. G01P 5/18
(52) U.S. Cl. .................................................. 73/861.05
(58) Field of Search ....................... 73/861.05, 861.42, 73/866.5, 170.02, 180, 182, 181.65, 181.66, 181.67, 181.42

(56) References Cited

U.S. PATENT DOCUMENTS

| | | | | |
|---|---|---|---|---|
| 3,262,316 A | | 7/1966 | Hansen et al. | ................ 73/388 |
| 3,612,439 A | | 10/1971 | Wingham | ................ 244/1 R |
| 3,646,811 A | * | 3/1972 | DeLeo et al. | ................ 73/182 |
| 4,836,019 A | * | 6/1989 | Hagen et al. | ................ 73/180 |
| 5,406,839 A | * | 4/1995 | Leblond et al. | ........... 73/170.02 |
| 5,442,958 A | * | 8/1995 | Hagen | ................ 73/170.02 |
| 5,544,526 A | | 8/1996 | Baltins et al. | ................ 73/180 |
| 5,811,691 A | | 9/1998 | Jackson | ................ 73/861.65 |
| 6,271,769 B1 | * | 8/2001 | Frantz | ................ 340/963 |

FOREIGN PATENT DOCUMENTS

| | | |
|---|---|---|
| DE | 10 55 265 B | 4/1959 |
| EP | 0 716 307 A | 6/1996 |
| EP | 1 020 717 A | 7/2000 |

* cited by examiner

*Primary Examiner*—Hezron Williams
*Assistant Examiner*—Jewel Thompson
(74) *Attorney, Agent, or Firm*—Westman, Champlin & Kelly, P.A.

(57) ABSTRACT

A semi-flush air data sensing probe is formed as an elongated bubble housing directly supported on an aircraft surface having a generally longitudinally extending rounded outer edge surface with a rounded contoured leading end. The housing has top and bottom wall surfaces extending from the supporting surface to the rounded outer surface. The trailing end of the housing is smaller than the leading end and is contoured to provide for smooth airflow past the housing. A central longitudinally extending plane that bisects the housing and which is perpendicular to the supporting surface, forms a reference. A forwardly facing port is at the leading end and centered on the central plane, and a pair of angle of attack sensing ports are on the leading end and are symmetrically located on opposite sides of the longitudinally extending plane. A static pressure sensing port also is provided on the housing at a position along the rounded outer edge surface and spaced downstream from the leading end.

19 Claims, 4 Drawing Sheets

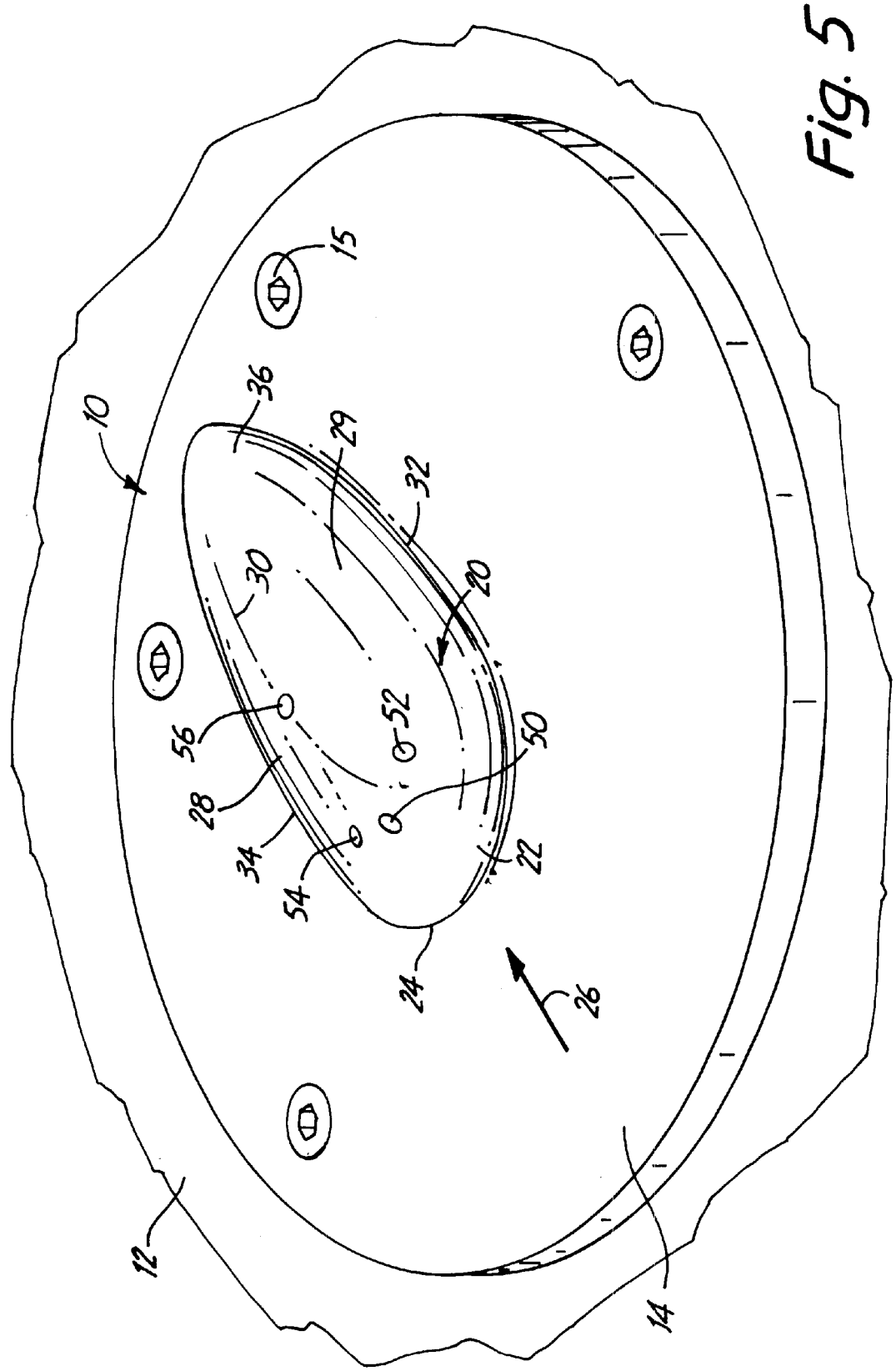

SEMI-FLUSH AIR DATA SENSOR

BACKGROUND OF THE INVENTION

The present invention relates to an air data sensor probe that will sense angle of attack or angle of sideslip as well as pivot and static pressure, and which is designed to substantially reduce drag, deicing/anti-icing power and weight over normal strut mounted probes, but yet give reliable results. The probe has an aerodynamically formed housing that extends like a small bulge outwardly from the side skin of an aircraft with angle sensing ports and a pitot port on a leading end, and static pressure sensing ports positioned in desired locations aft of the pitot port entry.

In the prior art, angle of attack has generally been measured either by vane sensors, cone sensors or multifunction probes with angle sensitive pressure ports. Vane sensors swivel about an axis to indicate changes in relative airflow direction, with suitable circuits for indicating the angle change. Multi-function probes have a barrel with top and bottom ports at the leading end of the barrel, and as the probe barrel axis changes angle, the ports sense differential pressure, to give an indication of angle of attack.

Static pressure has been sensed on probe assemblies as well, and flush mounted plates that have static pressure sensing ports in them are also utilized.

It is desirable to reduce drag and weight on high performance aircrafts, but reliable indications of angle of attack and static pressure are required for satisfactory high performance aircraft operation that is safe.

SUMMARY OF THE INVENTION

The present invention relates to a multi-function air data sensor that comprises an aerodynamically shaped body or housing protruding slightly from a mounting plate that is placed onto and is flush with the skin of an aircraft. The aerodynamic shape includes a rounded (part spherical) forward end, and smoothly contoured surfaces downstream from the forward end to result in low drag as air flows past the semi-flush body. The body is elongated in fore and aft direction generally aligned with the airflow. A cross section taken along a plane substantially perpendicular to the fore and aft axis and to the mounting area of the skin of the aircraft, has a shape similar to an end portion of an ellipse. The outer edge of the body decreases in lateral width gently, and the rear end is rounded back to the mounting surface.

The housing or body surface along the maximum outward dimension provides a location on which a static sensing port or ports can be placed.

The body extends from the mounting surface only a small amount and can remain in the boundary layer air along the aircraft surface. The body or housing is exposed to airflow and is positioned to provide a useable differential in pressure signals between the angle sensing ports.

In addition, the body of the semi-flush sensor has a port facing upstream, at its forward end, to provide a local total pressure or pitot pressure signal.

The mounting plate for the sensor can be flush with the aircraft skin, and can be curved to blend with curved aircraft surfaces. The "bubble" or housing forming the sensor body protrudes slightly into the airsteam, at a level and location to avoid adverse effects of aircraft components, and creates a small local disturbance in the airflow. The pressure ports can be located at various locations to measure the desired air data parameters. The housing forming the sensor body can be molded or formed integrally with the aircraft skin of a composite material or metal fuselage.

The protrusion from the aircraft skin is in the range of a few centimeters, and thus the sensor is lighter and has less drag than existing strut mounted air data sensing probes. The smaller size means that less power is required to deice or anti-ice. Very little ice accumulates near or on the aircraft fuselage skin, whereas strut mounted probes and vanes operate in a region spaced from the aircraft skin where moisture is concentrated due to the effects of flow past the fuselage of an aircraft. There are no moving parts in the present device, and the small size and aerodynamic shape means lower drag, lower weight, lower radar cross section, and less susceptibility to damage, such as bird strikes, refueling booms, and bumping by maintenance personnel. Many things that damage a strut mounted probe will merely flow over the aerodynamic shape of the present sensor. Since the sensor body does not protrude as far into the airstream from the fuselage or aircraft skin surface, there are fewer items that are likely to strike the protuberance or semi-flush sensor.

BRIEF DESCRIPTION OF THE DRAWINGS

FIG. 5 is a front perspective view of the sensor.

DETAILED DESCRIPTION OF THE ILLUSTRATIVE EMBODIMENTS

Figure 1:
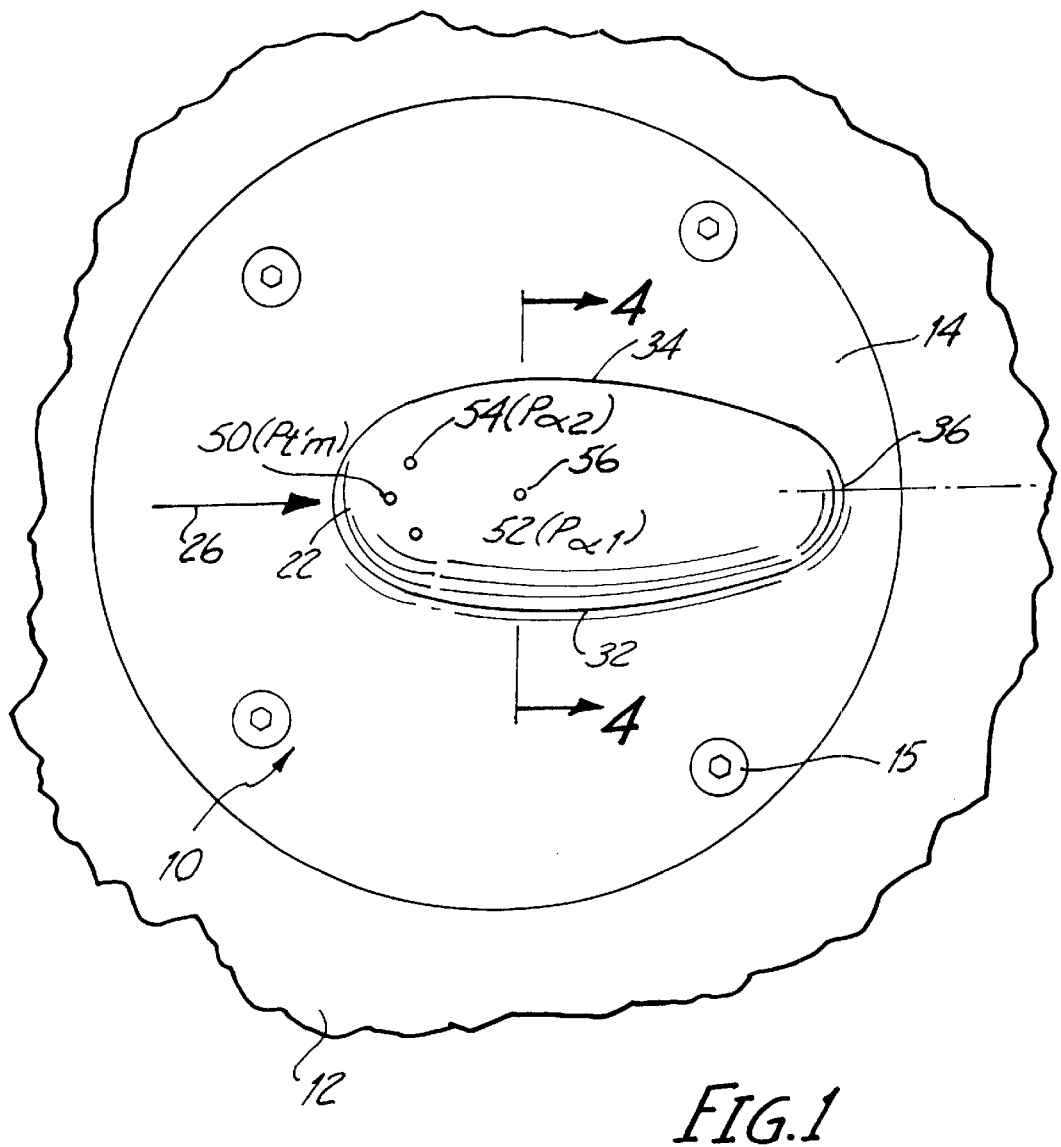
FIG. 1 is a elevational view of a semi-flush sensor made according to the present invention.
Figure 3:
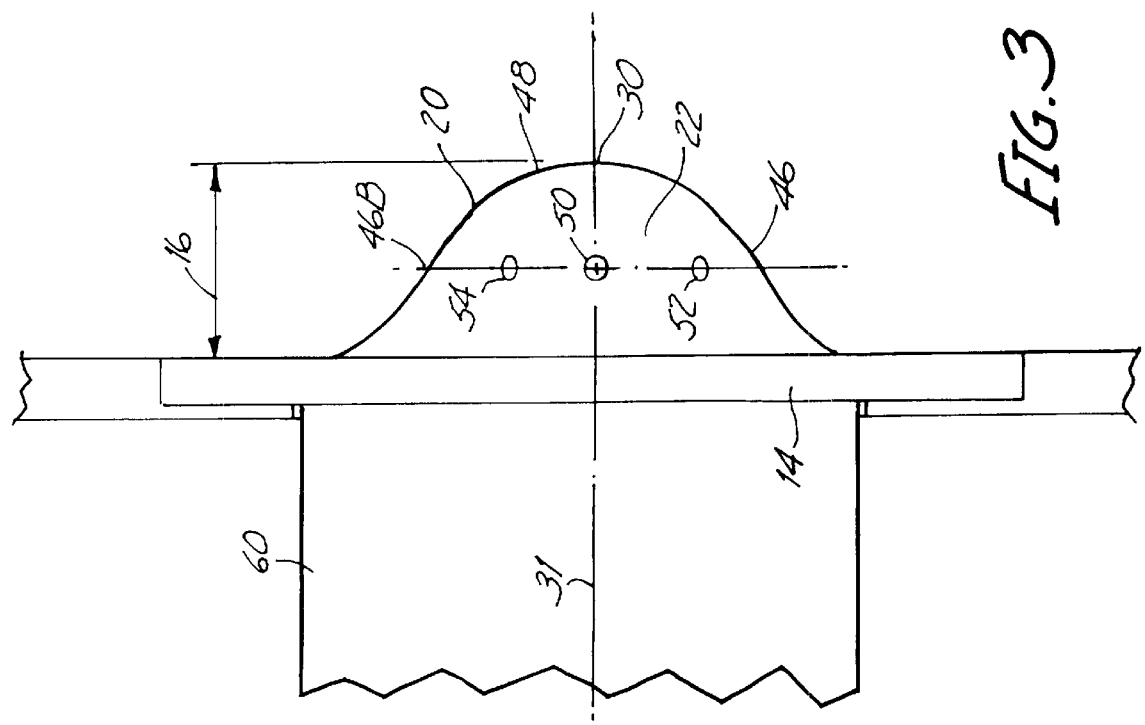
FIG. 3 is a front elevational view of the sensor shown in FIG. 1.

Referring to FIG. 1, a semi-flush air data sensor indicated generally at 10 is mounted onto the skin 12 of an aircraft, utilizing a mounting plate 14 that is held in place with suitable countersunk fasteners 15, so that, as shown in FIG. 3, the plate is flush with the aircraft skin. A mounting with the plate inside the fuselage can be used, or the probe housing can be integrally formed or molded into a composite or metallic skin.

Figure 4:
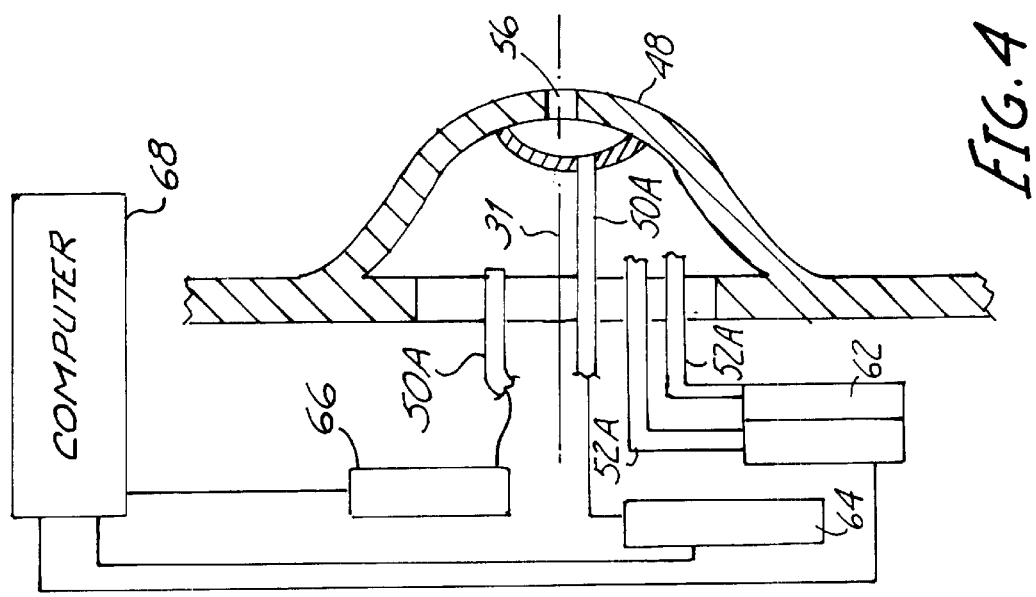
FIG. 4 is a sectional view taken as in line 4—4 in FIG. 1.

Sensor 10 has a bubble or blister type probe housing 20, that is aerodynamically smooth from a generally hemispherical or part spherical leading end shown at 22 which curves outwardly from the surface of the mounting plate 14 along a front edge 24 a desired distance, indicated generally by the double arrow 16 in FIG. 3. The front edge 24 of the leading end 22 joins a radius surface that is rounded to cause a minimum disruption of airflow, which is flowing in the direction indicated by the arrow 26 at 0° angle of attack. The semi-flush sensor or probe housing 20 smoothly transitions from the front end 22 outwardly to a generally longitudinally extending line 30 at the maximum lateral extension of the housing from the mounting surface. The line 30 may taper slightly inwardly toward the support surface 14 in rearward (downstream) direction. In cross section, as shown in FIG. 4, top and bottom walls 28 and 29 of the housing have outer surfaces 46A and 46B that converge from the peripheral edges of the housing at the support surface 14, laterally outwardly to a rounded part cylindrical outer end wall 48 on which line 30 lies. These top and bottom walls converge toward a central bisecting plane 31. Stated another way, the top and bottom walls diverge from the part cylindrical wall 48.

The central bisecting plane 31 passes through the central longitudinal axis of the probe housing 20 and is perpendicular to the surface of plate 14 and the aircraft skin surface.

The top and bottom edges 32 and 34 of the housing 20 along the outer surface of plate 14, and the peripheral edges of the housing at the leading and trailing ends 22 and 36, define a generally elliptical periphery in side view.

The top and bottom edges 32 and 34 join radiused surfaces that join the outer surfaces 46A and 46B of the top and bottom walls 28 and 29. In the side view of FIG. 1 the edges 34 and 32 curve upwardly and downwardly from the leading end 22 and then round back together, which is also rounded in side view, to form the small end of an elliptical shape. The FIG. 1 side view of the semi-flush probe housing 20 shows that the perimeter is a generally elliptical shape, but with different size leading and trailing ends, for smooth airflow characteristics. The top and bottom surfaces join surface 14 with radiused fillet surfaces and then join the outer surfaces of the walls 28 and 29, which converge toward and become tangent with the rounded, part cylindrical outer end wall portion 48.

The bottom or lower wall 29 tapers up to the rounded outer surface of the outer wall portion 48 and the upper wall 28 tapers downwardly to the surface of wall portion 48 of the housing, as shown in FIGS. 3 and 4. The upper wall 28 has an outer surface 46A and the lower wall 29 has an outer 46B that join the part cylindrical outer surface of portion 48. The maximum laterally outward dimension line 30 is a tangent line of a plane generally perpendicular to the bisecting plane 31 and engaging the outer surface of wall portion 48.

If desired, the plate 14 can curved to fit aircraft surfaces rather than being truly planar in order to permit mounting on various surfaces. The distance indicated by the double arrow 16 is such so that the housing 20 is preferably in the boundary layer of air that is on aircraft surfaces. The typical range of extension, but not as a limit, is between 0.5 and 2.5 centimeters. It is also recognized by the inventors that a variety of other flush shapes and configurations could be used to obtain flush air data angle of attack estimates. Keeping the protrusion of the housing, low but enough to obtain reliable pressure signals that indicate angle of attack is important.

The rounded front portion 22 has a pitot or impact pressure sensing port indicated generally at 50 for measuring $P_{t'm}$. The leading end 22 of the housing 20 also has angle of attack measuring ports including a top port 54 and a lower port. Port 54 will provide a pressure signal Pα, or $P_1$, and port 52 will provide a signal $P\alpha_2$ or $P_2$.

A single static port or a tightly grouped pattern of static pressure sensing ports can be placed along the tangent line indicating the maximum outward dimension to achieve the desired aerodynamic performance. One such port is shown at 56 Additional static ports can be provided along this line and averaged, if desired, for obtaining the measured static pressure ($P_s$)

Figure 2:
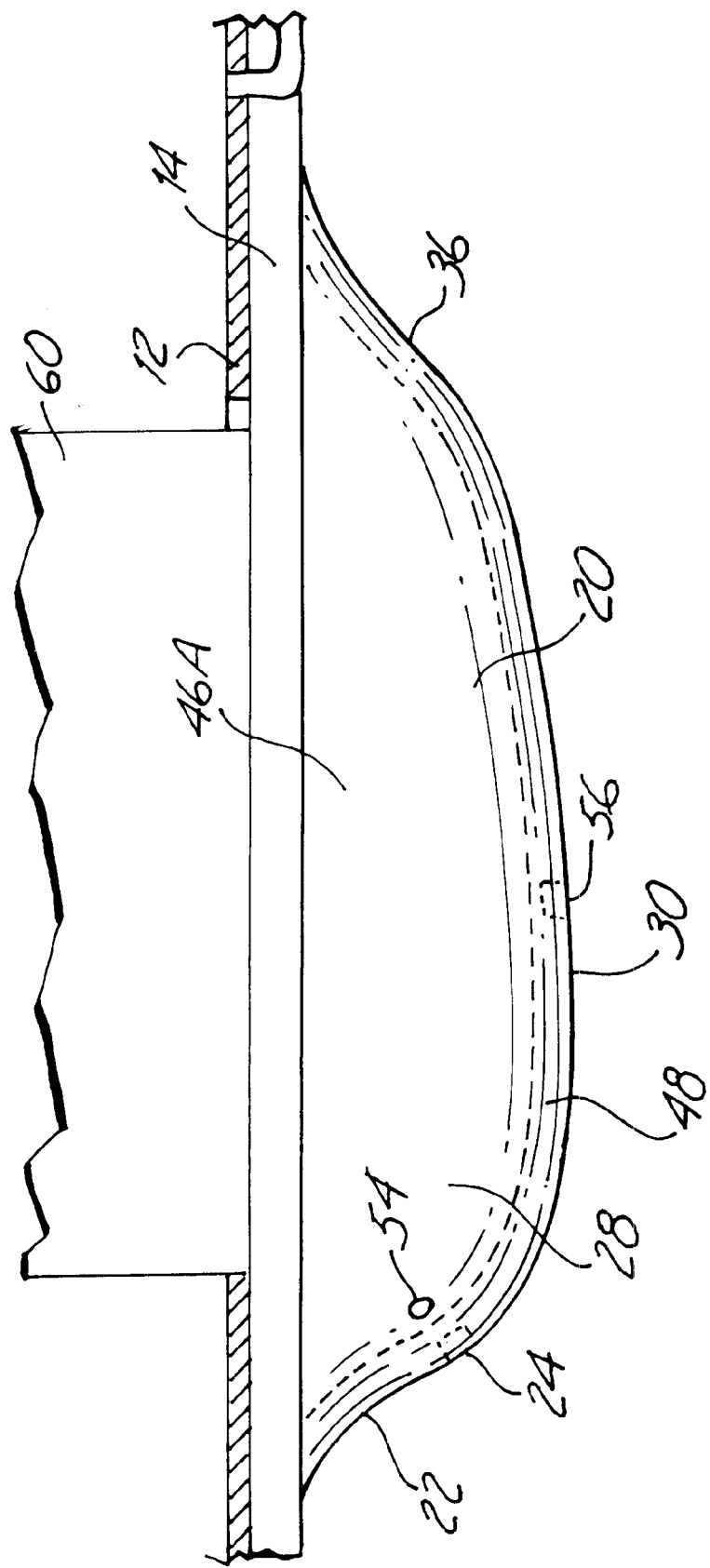
FIG. 2 is a top plan view of the sensor of FIG. 1 on an enlarged scale.

The various pressure signals are carried to an instrumentation package indicated generally at 60, as shown in FIGS. 2 and 4. Such instrument package can include various pressure sensors and conditioning circuitry, as well as a computer. The lines 52A and 54A shown in FIG. 4 provide pneumatic pressure signals to a differential pressure sensor 62 of known design. The line shown at 56A in FIG. 4 carries pressure signals from the static pressure sensing port 56 to an absolute pressure sensor 64, and the line 50A shown at FIG. 4 carries pressure signals from the pitot pressure port 50 to a pressure sensor 66. The pressure sensors provide electrical signals representing pressure at the connected ports to a central computer or processor 68 in the package 60. The computers or processors are programmed to utilize the pressure signals to provide the desired indications of angle of attack and static pressure.

The angle of attack measurement is presently carried out in the prior art multi-function probes by determining differences in pressures between top and bottom ports on a probe barrel that are positioned near the outer end of the probe. The pressure difference between the angle sensing ports is usually normalized by the local impact pressure ($q_{c1}$).

The semi-flush probe housing 20 of the present invention has been operated under wind tunnel test conditions. The semi-flush probe is first calibrated to zero angle of attack by adjusting the probe housing bisecting plane until the pressure difference between port 52 and port 54 is zero, meaning the sensors are indicating zero angle of attack. Then by changing the angle of attack of the bisecting plane the pressure signals $(P_1-P_2)/q_{c1}$ are measured and are nearly linear between plus or minus 20° angle of attack of the semi-flush probe housing. At higher angles of attack the pressure signal has somewhat reduced sensitivity, but still provides a variable signal proportional to the angle of attack.

A useful range of measuring angle of attack is at least −40° to +40°. With the use of an equation with a normalizing factor as a denominator designated $q_{n2}$, where $q_{n2}=(P_{t'm}-P_1)+(P_1-P_2)/2)$, an angle of attack signal can be determined for angles up to plus or minus 90°. This is accomplished by using $(P_1-P_2)/q_{n2}$ for angles up to approximately plus or minus 40° and then using the negative inverse of the pressure difference, $-q_{n2}/(P_1-P_2)$ for greater angles of attack. The use of the inverted ratio is described in U.S. Pat. No. 5,205,169, which is in corporated herein by reference.

The boundary layer has been found not to have a substantial effect on the angle of attack signal, It also has been found that measuring the static pressure along the maximum tangent line of the curved cross section probe provides adequate indications of static pressure.

The placement of the ports 52 and 54 can be essentially at the same angles as used on multi-function probes utilizing a cylindrical barrel. The location of such ports can be changed, as well, for reliable results.

The semi-flush probe housing 20 is formed so that the maximum extension from the surface of the air vehicle is kept small. The cross section taken along a plane perpendicular to the longitudinal center axis and perpendicular to the aircraft surface (FIG. 4) shows a rounded outer edge surface on wall portion 48 with a wall tapering up from the wall portion 48 relative to the central bisecting plane 31 another tapering down from wall portion 48 the top and bottom walls extend to the support plate 14 or aircraft surface in top and front views the leading edge is contoured or rounded in three dimensions (compound three dimensional curve), so that the form is a pact spherical surface 1 is about a quarter of a sphere. Although it is recognized other curved surfaces may also work, such as a parabola In side view (FIG. 1) the top and bottom edges at the aircraft skin are elliptical and taper to a narrow elliptical edge at the trailing end, which also is a compound curve surface rounded in three dimensions. The shape of the housing could be described as a half teardrop (cut through the axis of symmetry) that is mounted on a plate or formed integrally with a panel. A fillet round is placed where the half teardrop intersects the plate to gently transition between the housing surface and the mounting or panel surface.

Angle of sideslip (AOS) could be measured directly by mounting an additional unit on the bottom of the aircraft (instead of on the side). Alternatively, AOS could be derived by comparing differential static pressures or AOA angles between sensors on opposite sides of the aircraft.

The semi-flush system may also be integrated as a system and as a result $P_t$ & ADS would be added to its outputs of AOA & $P_{sj}$ thus producing a total air data system. Configurations using multiple semi-flush sensors would be able to provide $P_t$, $P_s$, AOA, and AOS Calibrations would be developed to relate the local values measured by the sensors to the desired free-stream values.

Although the present invention has been described with reference to preferred embodiments, workers skilled in the art will recognize that changes may be made in form and detail without departing from the spirit and scope of the invention.

What is claimed is:

1. A semi-flush air data sensing probe comprising a probe housing having walls forming a bubble protruding from a support surface, sad housing having a leading end surface that is rounded in three dimensions and having a rounded outer edge surface spaced from the support surface and extending in a fore and aft direction from a leading end to a trailing end and centered on a bisecting plane extending along a fore and aft central axis and positioned perpendicular to the support surface, the rounded outer edge surface joining top and bottom wall surfaces that diverge from the bisecting plane and extend to the support surface, the leading end surface extending outwardly from the support surface a maximum dimension measured along the bisecting plane, the rounded outer edge surface being smoothly tapered toward the support surface from the leading end surface a junction with the maximum dimension toward a trailing end, and at least one pressure sensing port on the housing.

2. The semi-flush probe of claim 1, wherein the at least one pressure sensing port is one of a pair of pressure sensing ports positioned on the leading end surface on opposite sides of he bisecting plane and facing forwardly and oppositely relative to the bisecting plane, thereby providing differential pressure signals between the pressure sensing ports when the bisecting plane is at an angle relative to airflow past the semi-flush probe.

3. The semi-flush probe of claim 1, wherein the at least one pressure sensing port is a static pressure sensing port formed in the rounded outer surface along a tangent line intersecting the rounded outer surface and extending in fore and aft direction.

4. The semi-flush probe of claim 1 wherein, the at least one pressure sensing port comprises a pitot port formed on the leading end surface and generally centered on the bisecting plane and facing toward relative airflow past the semi-flush probe.

5. The semi-flush probe of claim 1, wherein a perimeter of the semi-flush probe at the support surface is generally elliptical.

6. The semi-flush probe of claim 5, wherein the leading end of the perimeter having a larger dimension normal to the bisecting plane than the trailing end.

7. The semi-flush probe of claim 1, wherein the maximum distance of the rounded outer surface from the supporting surface is in the range of 2.5 centimeters.

8. The semi-flush probe of claim 1, wherein the maximum distance between the supporting surface and a plane substantially parallel to the supporting surface and tangent to the rounded outer surface is between 0.5 centimeters and 2.5 centimeters.

9. The semi flush probe of claim 1, wherein a line formed on the rounded leading end surface by the bisecting plane is curved from adjacent the support surface to the maximum dimension of the leading end surface.

10. The semi flush probe of claim 9, wherein a line formed by an intersection of a plane Perpendicular to the bisecting plane and passing through the rounded leading end surface curves equally and in opposite directions from the bisecting plane at all angular positions of the plane perpendicular to the bisecting plane, from a position of the reference plan substantially parallel to the support surface to a position substantially normal to the supporting surface.

11. The semi flush air data sensing probe of claim 1, wherein the rounded outer surface forms a surface of a quarter of a sphere centered on the bisecting plane and extending in directions perpendicular to the bisecting plane.

12. A semi-flush air data sensing probe comprising a housing having a formed wall extending from a support surface on an aircraft on which the probe is mounted into an air flow, said housing having a leading end surface that is rounded in three dimensions and having a rounded outer edge surface spaced laterally from the support surface and extending in fore and aft direction from a leading end to a trailing end, the rounded outer edge joining top and bottom wall surfaces of the housing that diverge in a curve from the rounded outer edge surface and extend back to the support surface, the rounded outer surface tapering from a maximum laterally extension toward a trailing end of the housing, the housing having a bisecting plane extending along a fore and aft central axis and perpendicular to the support surface, and at least a pair of pressure sensing ports positioned on the leading end on opposite sides of the bisecting plane and facing upstream relative to airflow and outwardly to the bisecting plane thereby having differential pressure sensed between the ports of the pair of ports when the bisecting plane is at an angle relative go airflow past the semi-flush probe.

13. The semi-flush probe of claim 12, wherein the housing has a static pressure sensing port formed in the rounded outer edge surface spaced downward from the pair of ports and centered on the intersection of the bisecting plane and the rounded outer surface.

14. The semi-flush probe of claim 12 and a pitot port formed on the leading end surface and generally centered between the pair of ports and on the bisecting plane to face toward relative airflow past the semi-flush probe.

15. The semi-flush probe of claim 14, wherein the pair of ports and the pitot port have axes that lie substantially on a common plane perpendicular to the bisecting plane.

16. The semi-flush probe of claim 15, wherein said common plane is spaced from the supporting surface to maintain the ports in airflow past the supporting surface.

17. An air data sensing probe for mounting onto an aircraft, said probe comprising a housing that extends outwardly from a surface of the aircraft and is elongated in fore and aft direction of the aircraft, the housing having a support side that is supported on the surface of the aircraft and extends in fore and aft direction, a leading end surface formed on the housing that is rounded in three dimensions, the housing having a bisecting plane generally perpendicular to the surface of the aircraft at the support side, and the rounded leading end surface extending outwardly from the support side to a maximum dimension, and extending on opposite sides of the bisecting plane symmetrically such that the rounded leading end surface is thereby curved in shape in the three dimensions, the housing having rounded to, and bottom surfaces joining the rounded leading end surface and extending the aft direction from the leading end surface, and the housing having a rounded trailing end tapering back toward the support side, and at least one pressure sensing port formed on the housing.

18. The air data sensing probe of claim 17, wherein a plane perpendicular to the bisecting plane and intersecting the surface of the housing forms curved lines at any location of the intersection between the housing surfaces and the plane perpendicular to the bisecting plane.

19. The probe of claim 18, wherein the at least one pressure sensing port is one of a pair of pressure sensing ports positioned on the leading end surface on opposite sides of the bisecting plane to provide differential pressure signals when the bisecting plane is at an angle relative to air flow directing past the probe.

* * * * *

UNITED STATES PATENT AND TRADEMARK OFFICE
CERTIFICATE OF CORRECTION

PATENT NO.    : 6,550,344 B2
DATED         : April 22, 2003
INVENTOR(S)   : Thomas J. Bachinski et al.

It is certified that error appears in the above-identified patent and that said Letters Patent is hereby corrected as shown below:

<u>Column 5,</u>
Line 19, "sad" should read -- said --;
Line 37, "he" should read -- the --;

<u>Column 6,</u>
Line 4,"Perpendicular" should read -- perpendicular --;
Line 64, "to," should read -- top --;

<u>Column 8,</u>
Line 1, "claim 18" should read -- claim 17 --.

Signed and Sealed this

Eighth Day of June, 2004

JON W. DUDAS
*Acting Director of the United States Patent and Trademark Office*